UNITED STATES PATENT OFFICE.

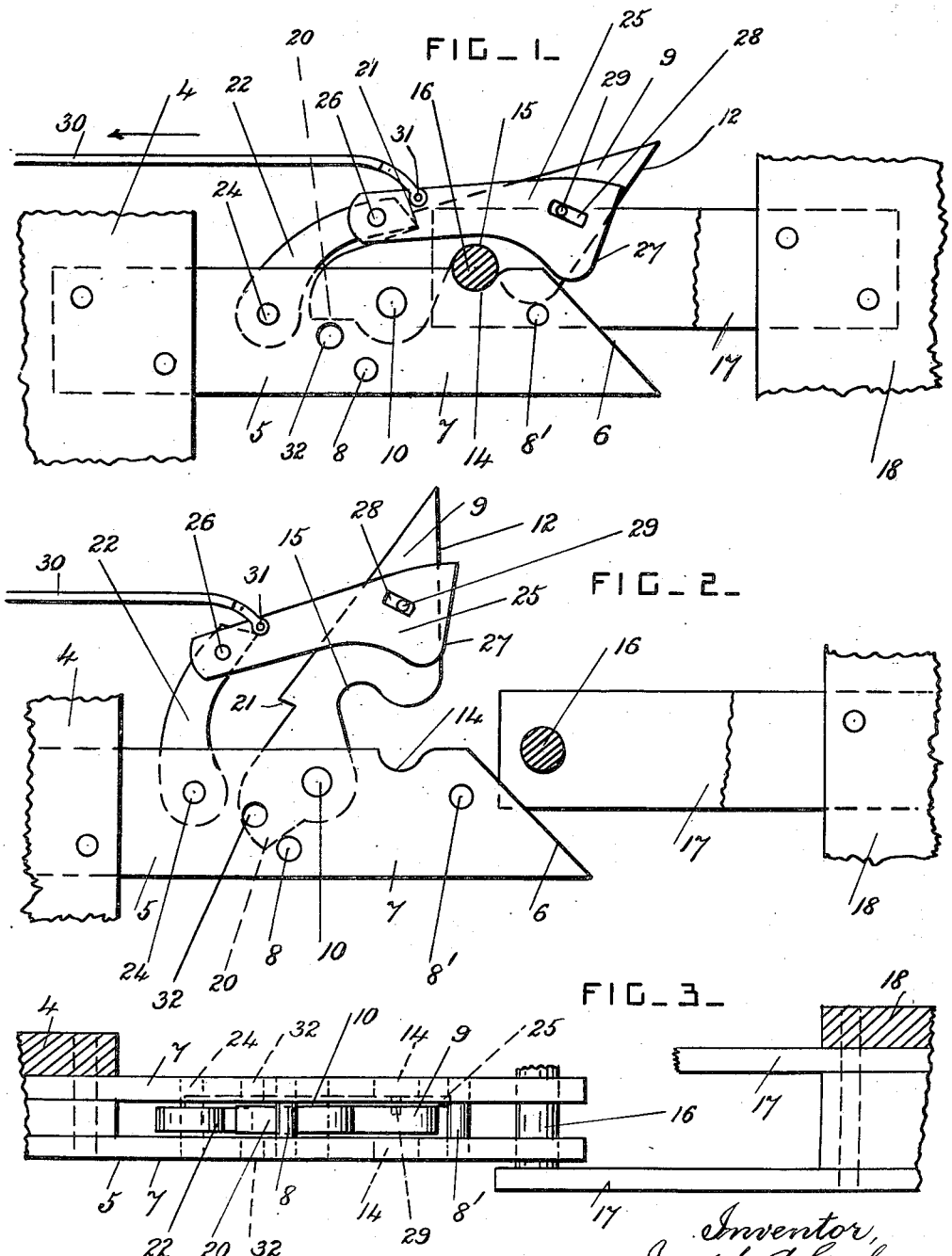
J. A. GRAHAM.
DRAFT ATTACHMENT.
APPLICATION FILED MAR. 17, 1921.
1,398,547.
Patented Nov. 29, 1921.

JOSEPH A. GRAHAM, OF ALLEMAN, IOWA.

DRAFT ATTACHMENT.

1,398,547.	Specification of Letters Patent.	Patented Nov. 29, 1921.

Application filed March 17, 1921. Serial No. 453,089.

*To all whom it may concern:*

Be it known that I, JOSEPH A. GRAHAM, a citizen of the United States, residing at Alleman, in the county of Polk and State of Iowa, have invented certain new and useful Improvements in Draft Attachments, of which the following is a specification.

This invention relates to draft attachments for vehicles, and more particularly to devices for coupling tractors or traction engines to agricultural implements or machines. This invention consists in the novel construction and combination of the parts hereinafter fully described and claimed whereby the tractor is automatically coupled to its load, and whereby the load is uncoupled at will by the operator on the tractor.

In the drawings, Figure 1 is a plan view of the draft attachment when coupled. Fig. 2 is a plan view showing the parts uncoupled, and with the coupling pin in section. Fig. 3 is a side view of the parts as shown in Fig. 2.

A portion of the frame 4 of a tractor or traction engine, or other similar vehicle, is shown, and 5 is a stationary jaw secured to the frame, and provided with a beveled rear end 6. The jaw 5 is preferably formed of two parallel plates 7 arranged horizontally and spaced apart by suitable distance pieces 8 and 8'. A movable jaw 9 is pivoted to the stationary jaw 5 by a pin 10, and has a beveled rear end 12. The beveled ends 6 and 12 form a V-shaped guide or entrance to the jaws, when the jaws are closed. These jaws constitute one coupling member.

The jaws 5 and 9 have semicircular opposed notches 14 and 15 respectively, for the coupling pin or link 16 of the other coupling member to engage with. This pin 16 is arranged vertically, and it may be the end portion of a link or bracket 17 which is secured to the front end portion 18 of the frame or draft bar of the agricultural implement or machine which forms the load to be coupled to the tractor.

The front end portion of the pivoted jaw 9 is provided with a stop lug 20 which engages with the front distance piece 8 when the jaws are open as shown in Fig. 2, and prevents them from being opened too widely. The jaw 9 engages with the other distance piece 8' when the jaws are closed as shown in Fig. 1.

A locking tooth 21 is formed on the outer side of the middle part of the pivoted jaw 9, and 22 is a locking pawl which is pivoted to the stationary jaw 5 by a pin 24, and which engages with the tooth 21 when the jaws are closed, as shown in Fig. 1. This pawl holds the two coupling members coupled together so that the load is drawn along by the tractor.

A push-plate 25 is pivoted at its front end portion to the pawl 22 by a pin 26, and it rests on the pivoted jaw 9. The push-plate 25 has a beveled rear end 27 which overlaps the beveled end 12 of the pivoted jaw. The push-plate has also a guide slot 28 arranged substantially at a right angle to the end 27, and slidable over a guide pin 29 which projects upwardly from the pivoted jaw.

An operating rod 30, or other similar operating device, such as a wire, cord or flexible connection, is connected to the push-plate 25 by a pin 31, and the pin 31 is arranged a little farther from the center line of draft, which passes through the coupling pin 16, than the pin 26 which connects the push-plate to the pawl.

When the two vehicles or machines are moved so as to be coupled together, the coupling pin 16 pushes back the push-plate 25, and unlocks the pivoted jaw from the pawl, and moves the parts to the positions shown at the left hand in Fig. 2. The coupling pin is then free to pass into engagement with the opposed notches. The pivoted jaw is then closed by the operating rod 30, and is locked to the stationary jaw by the pawl, as shown in Fig. 1. Any other approved means, such as a spring, may be provided for closing and locking the jaws. When the devices are to be uncoupled, the operating rod is pulled in the direction of the arrow in Fig. 1, thereby unlocking the jaw 9, and moving it pivotally to the position shown in Fig. 2.

Holes 32 are provided in the plates 7 for the insertion of a locking pin for the lug 20 to engage with when the parts are in the positions shown in Fig. 1. This enables the attachment to be used like an ordinary coupling, when desired.

What I claim is:

1. In a draft attachment, a coupling member comprising a stationary jaw, and a jaw pivoted to the stationary jaw and working in a substantially horizontal plane, said jaws having beveled rear end portions which form a converging guide and having opposed and substantially semicircular notches in front of the said guide; a coupling member having a coupling pin adapted to move the pivoted jaw and enter the said notches, means for locking the pivoted jaw when closed, and an unlocking device operatively connected with the locking means and adapted to be actuated by the coupling pin before it engages with the beveled end of the pivoted jaw.

2. In a draft attachment, a coupling member comprising a stationary jaw and a pivoted jaw, said jaws having beveled rear ends which form a V-shaped guide and having opposed notches, a coupling member having a coupling pin for engaging with the said guide and notches, means for locking the pivoted jaw in its closed position, and a push-plate operatively connected with the locking device and actuated by the said coupling pin before it engages with the beveled end of the said pivoted jaw.

3. In a draft attachment, a coupling member comprising a stationary jaw and a pivoted jaw, said jaws having beveled rear ends which form a V-shaped guide and having opposed notches, a coupling member having a coupling pin for engaging with the said guide and notches, a locking pawl pivoted to the stationary jaw and engaging with a tooth on the middle part of the pivoted jaw and locking the said jaw in its closed position, a push-plate supported by the pivoted jaw and projecting beyond its rear end, said push-plate having its front end portion pivoted to the said pawl, and means for operating the said push-plate and pawl by hand to unlock the pivoted jaw.

4. In a draft attachment, a coupling member comprising a stationary jaw and a pivoted jaw, said jaws having beveled rear ends which form a V-shaped guide and having opposed notches, a coupling member having a coupling pin for engaging with the said guide and notches, a locking pawl pivoted to the stationary jaw and engaging with a tooth on the pivoted jaw, a push-plate having its front end portion pivoted to the said pawl and having its rear end arranged to project beyond the end of the pivoted jaw, a slidable pin and slot connection between the rear end portions of the push-plate and pivoted jaw, and means for operating the said push-plate and locking pawl by hand.

In testimony whereof I have affixed my signature.

JOSEPH A. GRAHAM.